United States Patent [19]

Dands et al.

[11] Patent Number: 4,731,567
[45] Date of Patent: Mar. 15, 1988

[54] METHOD AND APPARATUS FOR AUTOMATED PARTS FOR STORAGE AND RETRIEVAL

[75] Inventors: George M. Dands, Columbia; Steven P. Downing, Perry Hall; Edmund J. Smith, Jr., Hanover, all of Md.

[73] Assignee: The United States of America as represented by the Secretary of the Air Force, Washington, D.C.

[21] Appl. No.: 828,010

[22] Filed: Feb. 10, 1986

Related U.S. Application Data

[63] Continuation-in-part of Ser. No. 649,445, Sep. 11, 1984.

[51] Int. Cl.$^4$ .............................................. G05B 11/18
[52] U.S. Cl. ...................................... 318/594; 318/602; 198/854; 414/273
[58] Field of Search ............... 318/603, 594, 602, 592; 198/854, 855, 856; 414/273

[56] References Cited

U.S. PATENT DOCUMENTS

| | | | |
|---|---|---|---|
| 3,303,922 | 2/1967 | Gore | 198/856 |
| 3,402,836 | 9/1968 | Debrey et al. | 318/602 X |
| 3,504,245 | 3/1970 | Cotton et al. | 318/594 X |
| 3,584,284 | 6/1971 | Beach | 318/594 X |
| 3,657,627 | 4/1972 | Inaba et al. | 318/603 X |
| 3,790,006 | 2/1974 | Hartman, III | 318/603 X |
| 3,850,105 | 11/1974 | Aronstein et al. | 318/592 X |
| 4,074,177 | 2/1978 | Olig | 318/602 |
| 4,106,005 | 8/1978 | Asakawa | 198/856 |
| 4,107,589 | 8/1978 | Eto et al. | 318/602 |
| 4,109,188 | 8/1978 | Shima et al. | 318/602 |
| 4,282,967 | 8/1981 | Boling et al. | 198/856 |
| 4,366,424 | 12/1982 | McKechme | 318/592 X |
| 4,415,975 | 11/1983 | Burt | 318/594 |
| 4,436,198 | 3/1984 | Houck et al. | 198/856 |
| 4,541,063 | 9/1985 | Doljack | 198/856 X |

Primary Examiner—Benjamin Dobeck
Attorney, Agent, or Firm—Jules J. Morris; Willard R. Matthews; Donald J. Singer

[57] ABSTRACT

The invention comprises an automated system 10 for the accurate positioning of movable parts bins 16 in relation to a preferred fixed location 26. The automated system consists of a number of movable parts bins 16 arranged on a conveyor 14 which is driven by a drive mechanism 18. The drive mechanism 18 controllably moves the conveyor 14 and therefore the bins 16 to desired locations in association with a coarse position sensor 24 and a final approach sensor 26. Both the sensors and the conveyor drive mechanism are interconnected with an electronic controller 28. This electronic controller monitors the position sensors in order to control the drive mechanism in a manner which positions the preselected parts bin at the desired location.

12 Claims, 4 Drawing Figures

METHOD AND APPARATUS FOR AUTOMATED PARTS FOR STORAGE AND RETRIEVAL

STATEMENT OF GOVERNMENT INTEREST

The invention described herein may be manufactured and used by or for the Government for governmental purposes without the payment of any royalty thereon.

RELATED APPLICATIONS

This is a continuation-in-part application of U.S. patent application Ser. No. 649,445 filed Sept. 11, 1984 and entitled "AUTOMATED PARTS STORAGE AND RETRIEVAL SYSTEM POSITIONING DEVICE AND METHOD".

BACKGROUND OF THE INVENTION

This invention relates to the accurate storage and retrieval of items from bins in an automated manufacturing system.

Automated parts storage and retrieval is a part of integrated automated manufacturing systems now being considered and constructed for virtually all areas of manufacturing. Such devices can be used either for temporary or long term storage of unmachined or machined parts, or for transport of parts from one manufacturing station to another. Typically, in conventional systems parts bins are accessed manually by a human operator who scans a series of bins for the desired part. In other operations, parts are physically carried from one machining center to another by parts bins on carousels or conveyors.

These activites have been gradually changing as automation increases in the factory. In instances where hundreds or thousands of parts must be accessed, complex electro-mechanical systems have been devised which automatically store and retrive parts. These systems can be procured commercially at great cost and generally require large storage areas and large bins. The need for quick and accurate accessing of parts storage bins without having to resort to overly complex and expensive devices is as yet unsatisfied.

The inherent positioning inaccuracies found in conventional drive mechanisms for conveyors and carousels generally stem from a number of factors, including chain or drive link stretching, gear backlash, inaccurate fabrication and loose assembly tolerances. These mechanical inaccuracies limit conventional devices in a number of ways. These limitations include large minimum bin spacing, large minimum bin size and low maximum speed. Exceeding these limtations by decreasing bin spacing or increasing speed results in erroneous accessing of incorrect bins.

It is an object of the present invention to provide a mechanism for accurately accessing a large number of closely spaced bins for the purposes of part removal or storage.

It is a further object of this invention to provide a mechanism that will accomplish the above object and yet be relatively simple to construct and inexpensive to manufacture.

Finally it is a further object of this invention to provide an automated, computer controlled parts storage and retrieval device that can be easily integrated into a larger computer controlled environment such as found in automated factories.

SUMMARY OF THE INVENTION

The invention comprises an automated system for the accurate positioning of movable parts bins in relation to preferred fixed locations. The automated system consists of a number of movable parts bins arranged on a conveyor or carousel, which is driven by a drive mechanism. The drive mechanism controllably moves the conveyor and therefore the bins to desired locations in association with a coarse position sensor and a final approach sensor. Both the sensors and the conveyor drive mechanism are interconnected with an electronic controller. This electronic controller monitors the position sensors in order to control the drive mechanism in a manner which will position a preselected parts bin at a desired location.

A further element of the preferred embodiment of the invention is a control method for positioning a preselected bin. The preferred method comprises loading an electronic controller with data relating the predetermined location desired and the preselected parts bin to be moved to that location. This data is used to select a first movement speed for the drive mechanism which moves the conveyor belt and parts bins. The coarse position sensor is then monitored until the parts bin approaches an auxiliary predetermined location near the final predetermined location. A second, slower movement speed is then set for the conveyor and parts bin.

At this second movement speed the coarse position sensor is once again monitored until a final approach sensor senses the approach of the preselected parts bin, the electronic control then arrests movement of the conveyor and parts bin so that the parts bin will stop at precisely the predetermined location selected. This use of the conveyor position data obtained from the coarse sensor is used to achieve a positioning response which is characteristically damped; it allows the conveyor to travel at high speed until it reaches a position just prior to the desired stopping point. The conveyor is then decelerated to a slow speed and allowed to stabilize at that slow speed before reaching its predetermined final position.

A further aspect of the preferred method of precisely moving a preselected parts bin to a predetermined location includes a preliminary method for calculating mechanical changes in the conveyor mechanism due changes in belt length, backlash, and the weight of parts in the bins. This is accomplished through the use of a separate home sensor which only senses a single location on the conveyor. A complete rotation, or circulation, of the conveyor is therefore required for the home sensor to twice sense this particular marked location. In between the two sensings of the home location on the conveyor the coarse position sensor is monitored for its number of rotations, or counts, during the complete circulation of the conveyor belt. In this way the coarse position sensor readings can be compared to the known route of the conveyor and precise fixed locations calculated by the electronic control based on the conveyor belt length at the time of operation.

BRIEF DESCRIPTION OF THE DRAWINGS

The foregoing and other objects and advantages of the invention will be apparent from the following more particular description of the preferred embodiments of the invention, as illustrated in the accompanying drawings, in which like reference characters refer to the same parts throughout the different views. The drawings are not necessarily to scale, emphasis instead being placed upon illustrating the principles of the invention.

DETAILED DESCRIPTION OF THE INVENTION

Figure 1:
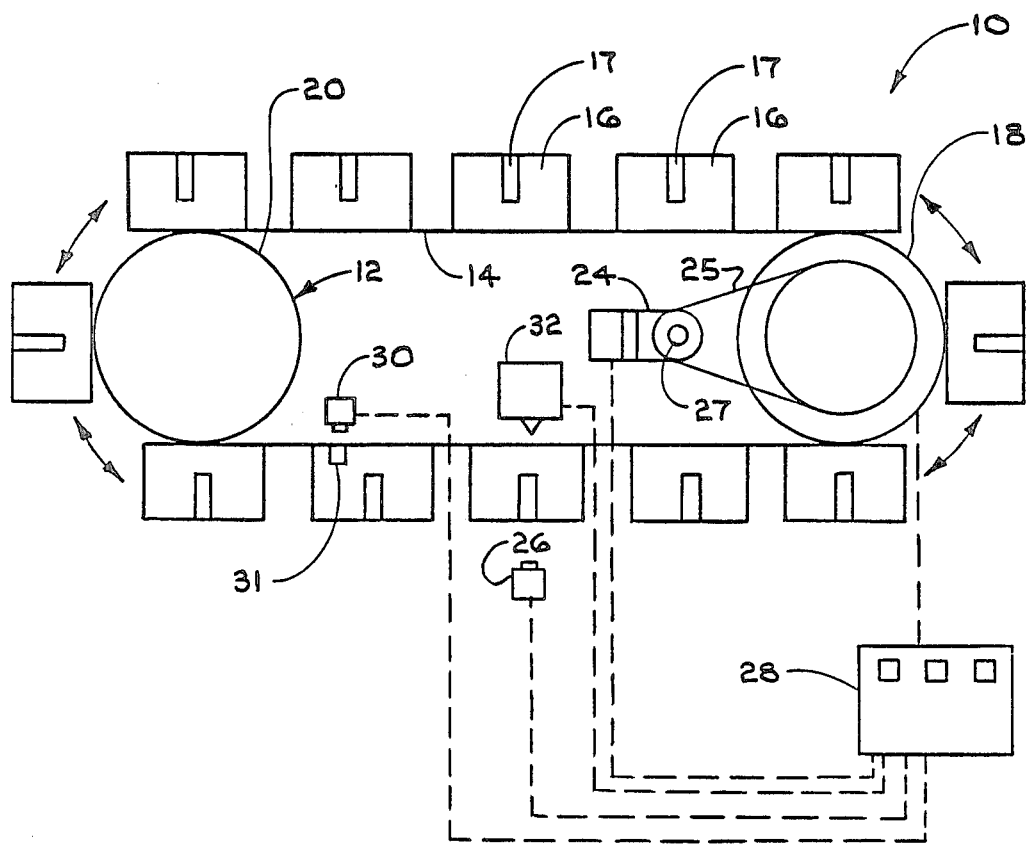
FIG. 1 is a schematic representation of an automated system for the accurate positioning of movable parts bins in relation to fixed locations.

FIG. 1 discloses in schematic form, an automatic positioning device for bins on a carousel conveyor. The automatic parts storage and retrieval device 10 is built around a conventional bin conveyor system 12. The conveyor system comprises a conveyor belt 14 which supports bins 16. The conveyor belt 14 forms a continuous loop which moves around motorized roller 18 and passive roller 20. The bins 16 are thus moved around in a route that eventually returns them to their starting place. Carousels of this type can be constructed with a large number of passive and motorized rollers to complete quite complex circuits. As a result of this, conveyor belt backlash and stretch are important considerations when attempting to accurately position a bin carried by such belt relative to a fixed location.

The positioning system (generally 10) comprises several major elements including position sensor and an interactive electronic control 28. A coarse position sensor 24 is used to determine the general location of bins on the belt and a final approach sensor 26 is used to precisely position a particular bin 16 at a particular location. Both of these sensors are used in conjunction with the interactive electronic control 28 that is programmed to determine bin position.

In the preferred embodiment of the invention, a sensor belt 25 is connected to motorized roller 18 to drive a sensor shaft 27. A selsyn type sensor can be used as the coarse position sensor to sense rotation of the shaft 27 and its signal can be converted to digital pulses for the electronic control. Typically, one revolution of the system results in about 5000 coarse position pulses (counts). Other types of common commerical sensors can also be used that detect the rotation of a shaft. For example, coarse position sensing can be accomplished by using an optical shaft encoder (Encoder Products Co., Model 711). This encoder can be mounted on an output shaft of a fifty to one gear reduction box in order to produce the high number of pulses which results in increased precision positioning. The coarse position sensor could also be easily replaced with a reluctance type sensor (which counts the teeth on a drive sprocket).

The final approach sensor 26 is most preferably a photoelectric type sensor similar to the conventional sensors used in elevators and automatic doors. Alternates for the fine position sensor includes other optical type sensors and micro switches. These sensors detect a reflection of a light beam from a reflective surface such as a mirror or tape. In this instance, the bins 16 on the carousel all have reflective strips 17 which activates sensor 26 causing it to sense the presence of a bin. The reflective strips 17 are centrally located on each bin 16 so that any possible misalignment of the bin relative to the desired location is minimized.

In order to solve the problems of belt stretch and backlash a home sensor 30 is used in conjunction with the coarse sensor 24. The home sensor is similar or identical in type to the final approach sensor but is positioned to sense a different reflective tape. The home sensor 30 is also electronically connected to the control 28.

In many instances a robot arm (shown schematically at 32) controlled by the electronic controller would be placed at a fixed location in order to place and retrieve items from storage bin 16. In order to enable the electronic control 28 to precisely position a desired storage bin 16, the motorized roller 18 is also tied into the interactive electronic control 28.

Many of the standard scientific microprocessors on the market made by such companies as the Digital Computer Company of Massachusetts or the Hewlett Packett Company of Washington State could easily be programmed to operate several carousel control systems.

Figure 2:
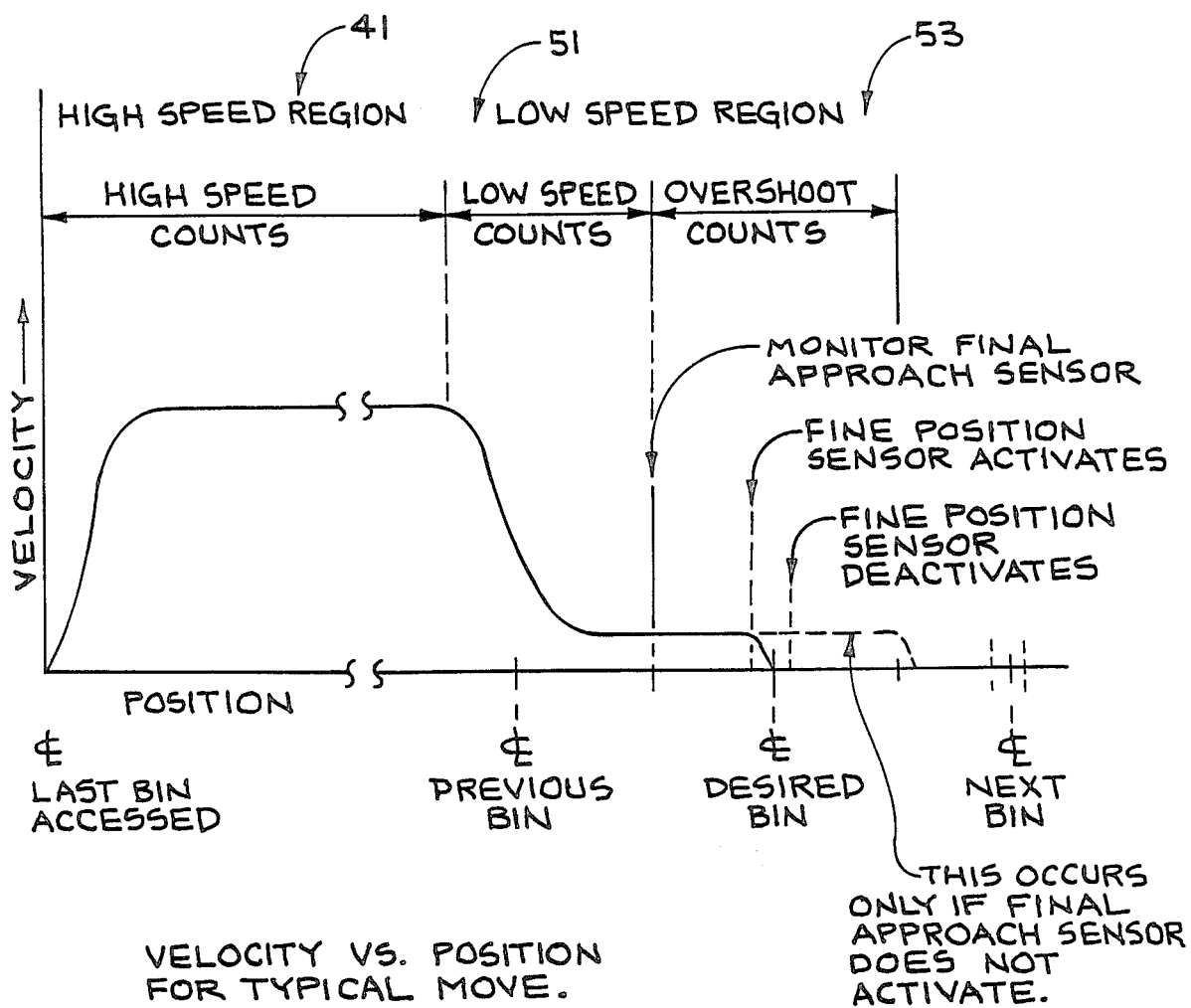
FIG. 2 is a graphic representation of velocity versus position for a typical operation of the device of FIG. 1.
Figure 3:
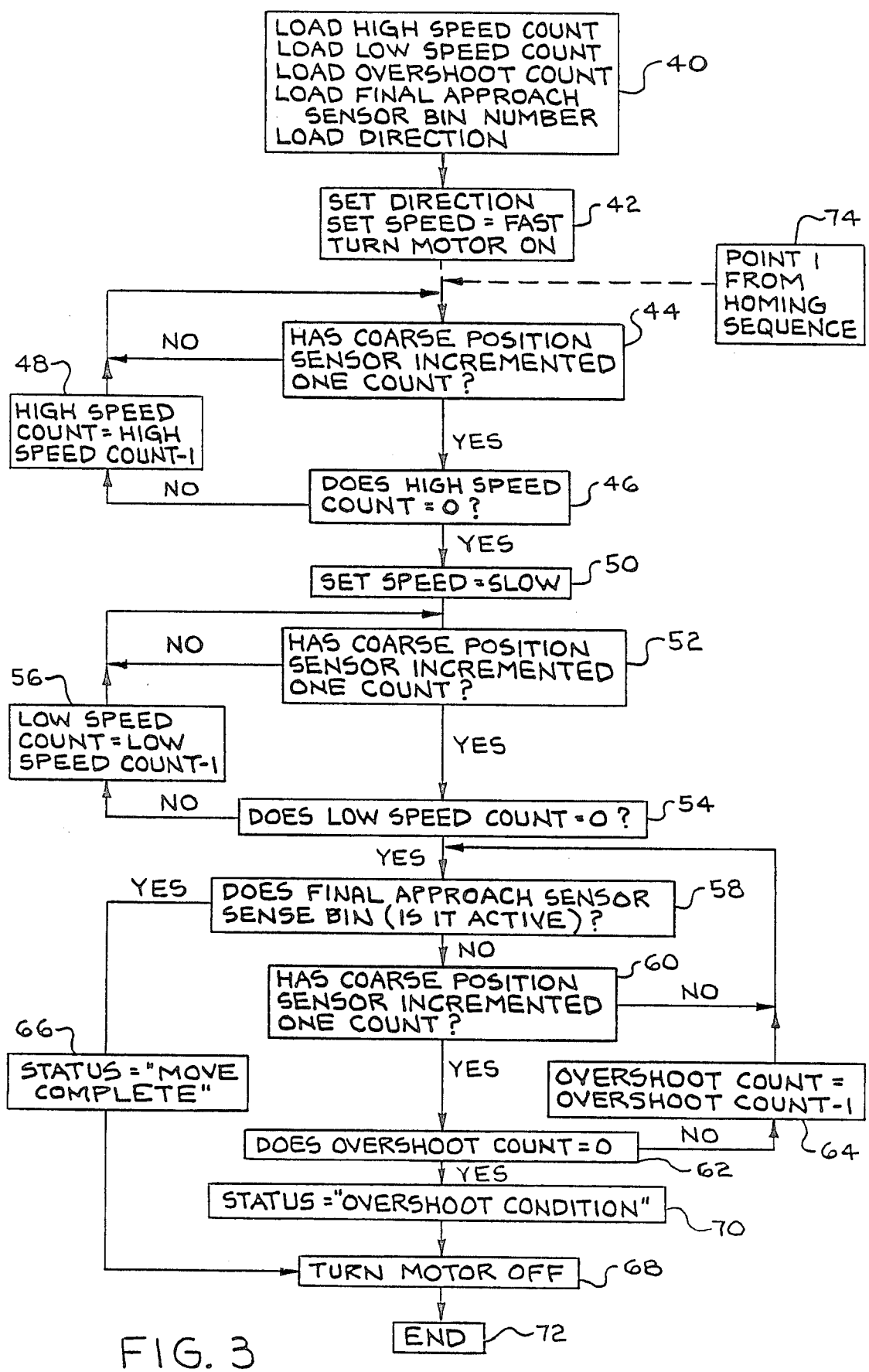
FIG. 3 is a flow chart disclosing how an electronic control would operate the device of FIG. 1 in order to move a particular parts bin to a desired location.

Operation of the automatic positioning device can be more readily understood with reference to FIGS. 2 and 3. FIG. 2 is a position versus velocity graph of bins traveling to a desired stopping point. FIG. 3 is a flow chart of the computer program implemented by the interactive electronic control during a basic position move of the automatic positioning device 10.

During a basic move sequence, the electronic control 28 is initially loaded with a desired high speed count, low speed count and overshoot count for the coarse sensor. The electronic control is also loaded with the bin number to be sensed by the final approach sensor and the travel direction that will most quickly bring the selected bin to the desired location. This information can either be loaded manually or by a higher level computer in an computerized factory. This information load is shown schematically in block 40 at the top of FIG. 3.

The electronic control 28 next sets the conveyor belt direction, the motor speed and turns the motor on (block 42). At this point the motorized roller 18 begins to rotate and drive the conveyor belt 14. This can be seen graphically in FIG. 2 at the left most portion of the graph labeled "high speed region" 41. In this region the motor quickly accelerates the conveyor to a steady-state high speed identified by the flat portion of the curve.

As the conveyor belt begins to move the coarse position sensor 24 is rotated by the motorized roller 18 through belt 25. The sensor shaft 27 rotates very quickly relative to the movement of the conveyor belt and therefore a great many pulses are produced by the sensor during movement of the conveyor.

The electronic control monitors for pulses from the coarse position sensor (block 44). This continues until it senses a pulse, the control then checks to see if the high speed count (that was initially loaded at block 40) has counted down to zero. If the high speed count does not equal zero, a pulse is subtracted from the count (block 48) and the microprocessor continues to monitor for pulses from the coarse position sensor (block 44).

When the high speed count equals zero, the control will, after the next coarse position sensor pulse, move on to the next step of the program and set the motor speed at a slower rate (block 50). This can also be seen graphically in FIG. 2 as section 51 labeled "low speed counts". At this point in the program the motor speed and therefore the conveyor belt speed slows down to a steady-state low speed rate as can be seen by the flat section of the curve at the right side of the low speed region (region 51).

The electronic control continues to monitor the coarse position sensor for pulses (block 52). Each time the electronic control detects a pulse it compares the low speed count to zero to see whether to proceed to the next step (block 54). If the low speed count does not equal zero (low speed count from block 40) the electronic control substracts one from the low speed count (block 56) and returns to monitoring the coarse position sensor (block 52).

When the low speed count equals zero the computer begins to monitor the final approach sensor 26, FIG. 1 (block 58). At this point the desired preselected bin is approaching the final approach sensor at the slow speed while the previous bin has already passed by the final approach sensor. The previous bin is therefore not be capable of giving a false indication to the final approach sensor.

Although the microprocessor is monitoring the final approach sensor, it also is continuing to monitor the coarse position sensor (block 60). Each time it senses a pulse from the coarse position sensor, the microprocessor compares the number of counts remaining in the overshoot count (initially loaded at block 40) with zero. This comparison is done at block 62. If the overshoot count does not equal zero it is diminished by one (block 64) and monitoring continues. During the countdown of the overshoot count the final approach sensor should sense the approach of the preselected bin. The final approach sensor should perceive the presence of the desired bin over the area limited by the lines marked "fine position sensor activates" and "fine position sensor deactivates" (FIG. 2). If that happens the computer program arrives at block 66 marked "move complete". The next step is to turn the motor off to arrest the movement of the bin (block 68). The positioning system is tuned so that once the motor is turned off the conveyor will glide to a stop with the center line of the desired bin at exactly the desired fixed location.

The overshoot counts are monitored in order to prevent the bin following the preselected bin from reaching the final approach sensor and giving an incorrect signal. When the overshoot count reaches zero (block 62), which only happens if the final approach sensor fails to sense the desired bin, the microprocessor arrives at the "overshoot condition" (block 70). The microprocessor controller then proceeds to turn the motor off (block 68) as can be seen in FIG. 2 by the dotted line in region 53 labeled "overshoot counts".

In either case, when the preselected bin has been precisely positioned by the final approach sensor or in the fail safe condition when the preselected bin has moved past the final approach sensor, the motor is turned off and the computer program reaches its end (block 72). The system status is then transmitted to a human operator or a high level computer.

Figure 4:
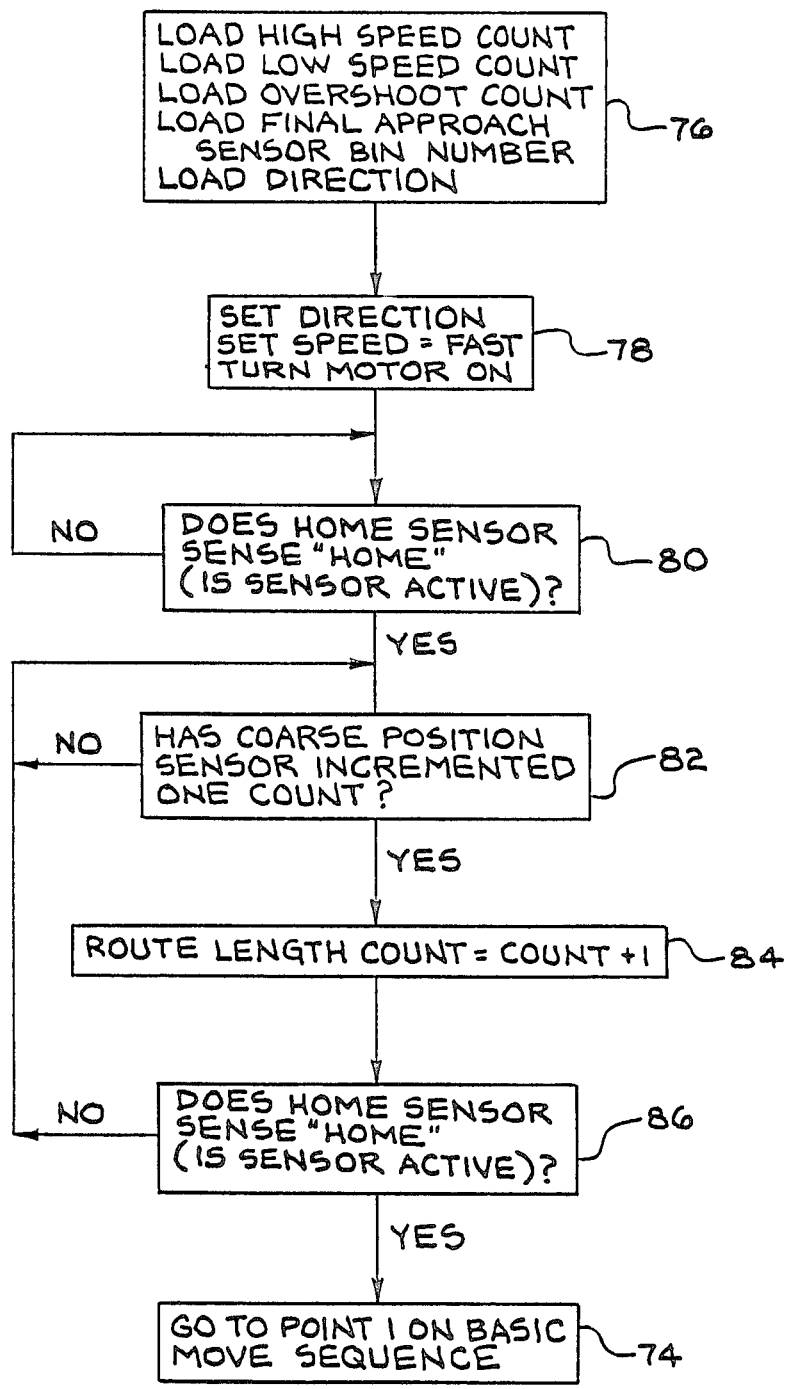
FIG. 4 is a flow chart disclosing how the electronic control can calculate changes in the route length of a conveyor belt.

Bin alignment inaccuracies are minimized by an evaluation of belt length, stretch, and backlash that is performed during system startup. In order to counteract the influence of the above factors in bin positioning, the photoelectric home sensor 30 is used in conjunction with the homing program displayed in the flow chart of FIG. 4. When the homing program is performed, the basic move sequence is entered at point one block 74 (FIGS. 3 and 4) and blocks 40 and 42 (FIG. 3) are skipped. This is shown graphically by the dotted lines of FIG. 3.

The first step in the homing sequence comprises loading the computer control with a high speed count, a low speed count, an overshoot count, the bin number that the final approach sensor is seeking and the preferred direction of travel of the conveyor belt (block 76). This information is also used when the conveyor system seeks the first preselected bin during the basic move sequence. After the computer control is loaded (block 76) the computer sets the conveyor direction, sets the motor speed to fast and turns the motor on (block 78). The computer then monitors the home sensor until it senses the one piece of reflective tape 31 that is aligned with it. This reflective tape 31 passes the home sensor 30 only once during a revolution.

When reflective tape 31 passes by the home sensor the microprocessor begins to monitor the coarse position sensor (block 82). Each time a pulse is received from the coarse position sensor the computer counts (block 84). The count continues until the home sensor once again senses the home reflective tape 31 (block 86). At this point the computer program halts the count and proceeds to block 74 (FIGS. 3 and 4) labeled "point one".

The homing program thereby takes a census of the number of coarse position sensor "counts" (pulses) for one full revolution of the conveyor carousel. The microprocessor or alternately a higher level computer then calculate changes in conveyor belt length and positioning. The positioning system computations are then adjusted so that the microprocessor will correctly align the preselected bin with the fixed location desired. Most simply put, the number of coarse sensor counts is compared against the circumference of the conveyor system so that the number of counts for a particular distance around the belt is desired can be easily calculated.

In many instances several fixed locations are provided along the periphery of the conveyor. In each of these locations a final approach sensor is provided which the microprocessor monitors according to the program described in reference to FIG. 3. As the number of bins and preferred locations increases it is most important to adjust the program data for changes in belt length so that only the correct parts will be stored and retrieved from the moving bins. This is all accomplished in a straight forward manner using the sensing means described in FIGS. 1 and 4. This system, as shown in FIG. 1, could easily accommodate at least 100 parts bins.

This positioning system yields precise positioning feedback because the sensors are placed as close as possible to the actual stop positions. Numerous sensors are not required to provide a means for identifying a particular bin 16 on the conveyor. This problem is solved through the use of the coarse position sensor to monitor overall conveyor position. It is only when a preselected bin is nearing its desired location that the final approach sensor at that location is monitored. The final approach sensor is generally monitored from the mid point between the desired bin and the previous bin until it senses the arrival of the desired bin.

The conveyor position data obtained from the coarse sensor is used to achieve a position response which is characteristically damped. This allows the conveyor to travel at high speed until it reaches a threshold position just prior to the desired stopping point. Upon reaching this position the conveyor is decelerated to a slow speed and stabilized at that slow speed. The final approach position sensor is then activated by the reflective tape on the bin desired.

The final approach sensor can, in addition to initiating the stop, be used to verify that the conveyor is stopped within the required accuracy. This is accomplished by selecting the sensor aperture and reflective tape width so that the fine position sensor will remain active (sensing the bin) during the stop condition. Failure of the fine position sensor to sense the bin after motion has stopped would indicate that the positional accuracy requirements have not been met and that the bin has either fallen short or overshot its desired location. Should either of those two conditions occur the homing program would automatically be run in an attempt to fine tune the positioning device. In this sense, the homing program is used to recalibrate the positioning system.

While the invention has been particularly described with reference to the preferred embodiments thereof, it will be understood by those skilled in the art that various changes in substance and form may be made therein without having departed from the spirit and the scope of the invention as detailed in the attached claims.

We claim:

1. An automated system for accurate positioning of movable parts bins comprising:
   (a) several movable parts bins
   (b) a conveyor for movably supporting said parts bins,
   (c) a drive mechanism for controllably moving said conveyor
   (d) a coarse position sensor for determining bin position relative to a fixed location during movement of said conveyor said coarse position sensor having a shaft that undergoes numerous revolutions for each complete rotation of said conveyor;
   (e) a final approach sensor for precise positioning of a predetermined bin relative to a fixed location, said final approach sensor active only during preselected revolutions of said coarse position sensor; and
   (f) an interactive electronic controller connected to said coarse sensor, said final approach sensor and said drive mechanism, said controller for constantly monitoring said coarse position sensor and relating signals from said sensors to parts bin locations and for controlling part bin movement by controlling said drive mechanism.

2. The automated system of claim 1 further comprising a home sensor for use by the controller to calculated changes in conveyor belt length.

3. The automated system of claim 1 wherein said final approach sensor is a photoelectric sensor.

4. The automated system of claim 1 wherein said coarse position sensor is rotatively connected to said drive mechanism by a rotation multiplying means.

5. The automated system of claim 1 wherein said parts bins further comprise reflective strips.

6. The automated system of claim 1 wherein said coarse sensor comprises an optical shaft encoder.

7. A method of precisely moving a preselected parts bin among several parts bins on a conveyor to a predetermined location comprising the following steps:
   (a) loading an electronic controller with data relating to the predetermined location and the preselected parts bin;
   (b) setting a first movement speed for a drive mechanism which moves said parts bins;
   (c) monitoring a rapidly rotating coarse position sensor as said selected parts bin approaches the predetermined location, said coarse position sensor having a shaft that undergoes numerous revolutions for each complete rotation of said conveyor;
   (d) setting a second movement speed for said drive mechanism;
   (e) activating a final approach sensor as the preselected parts bin approaches the predetermined location;
   (f) monitoring said coarse position sensor as the final approach sensor senses the approach of said preselected location; and
   (g) arresting movement of the drive mechanism and therefore said parts bins.

8. The method of precisely moving a preselected parts bin among several parts bins to a predetermined location of claim 8 further comprising the step of monitoring said coarse position sensor to determine if said preselected parts bin has overshot said final approach sensor.

9. The method of precisely moving a preselected parts bin among several parts bins to a predetermined location of claim 8 further comprising the step of monitoring the coarse position sensor during a complete revolution of a conveyor carrying said parts bin in order to detect changes in conveyor belt length.

10. A method for accurate positioning of a selected bin of a conveyor at a desired location, comprising the steps of:
    driving said conveyor in a given direction at a first speed;
    detecting, with a coarse sensor, entry into a first detection condition of a next prior bin before said selected bin, said coarse sensor having a shaft that undergoes numerous revolutions for each complete location of said conveyor;
    monitoring a desired final approach sensor;
    reducing said first speed to a lower second speed;
    detecting, with said final approach sensor, entry of said selected bin into a second detection condition; and
    reducing said second speed to zero.

11. The method of claim 10 further comprising the steps of monitoring said coarse sensor detection signal, detecting when said coarse sensor detection signal exceeds a predetermined limit, halting conveyor motion, and indicating an overshoot condition.

12. The method of claim 10 further comprising the step of monitoring said final approach sensor after said bin speed is reduced to zero in order to verify final bin position.

* * * * *